United States Patent [19]

Breed

[11] Patent Number: 5,233,141

[45] Date of Patent: Aug. 3, 1993

[54] SPRING MASS PASSENGER COMPARTMENT CRASH SENSORS

[75] Inventor: David S. Breed, Boontown, N.J.

[73] Assignee: Automotive Technologies International Inc., Mountain Lakes, N.J.

[21] Appl. No.: 727,757

[22] Filed: Jul. 9, 1991

Related U.S. Application Data

[63] Continuation-in-part of Ser. No. 480,273, Feb. 15, 1990, and Ser. No. 480,271, Feb. 15, 1990, Pat. No. 5,155,307, Ser. No. 480,257, Feb. 15, 1990, Ser. No. 686,717, Apr. 17, 1991, abandoned, which is a continuation-in-part of Ser. No. 314,603, Feb. 23, 1989, abandoned.

[51] Int. Cl.$^5$ ............................................. H01H 35/14
[52] U.S. Cl. ............................ 200/61.45 R; 200/61.48; 200/61.51
[58] Field of Search ............ 200/61.45 R–61.53; 307/121

[56] References Cited

U.S. PATENT DOCUMENTS

| | | | |
|---|---|---|---|
| 3,522,575 | 8/1970 | Watson et al. | 439/281 |
| 4,249,046 | 2/1981 | Livers et al. | 200/61.45 R |
| 4,262,177 | 4/1981 | Paxton et al. | 200/61.45 R |
| 4,329,549 | 5/1982 | Breed | 200/61.45 M |
| 4,580,810 | 4/1986 | Thuen | 280/734 |
| 4,932,260 | 6/1990 | Norton | 200/61.53 X |
| 4,995,639 | 2/1991 | Breed | 180/274 X |
| 5,010,216 | 4/1991 | Sewell et al. | 200/61.45 M |
| 5,010,217 | 4/1991 | Hueniken et al. | 200/61.45 R |
| 5,059,751 | 10/1991 | Woodman et al. | 200/61.45 M |

*Primary Examiner*—J. R. Scott
*Attorney, Agent, or Firm*—Sprung Horn Kramer & Woods

[57] ABSTRACT

This invention includes crash sensors designed to be used for frontal impact sensing and the strategies of using these sensors. It is analyzed and shown that for cases where the passenger compartment mounted discriminating sensor is used as a backup to forward crush zone mounted crash sensors or where the vehicle occupant is wearing a seat belt, that spring mass sensors can be used. In addition, spring mass sensors can also be used as arming or safing sensors. In all cases, provision must be made to minimize the effects of cross-axis vibrations on such sensors as taught by this invention. Such sensors can be made with housings of plastic. A preferred embodiment of this invention utilizes a mass supported and biased by a beam contact which is attached to a housing. These sensors are useful for sensing frontal impacts in the passenger compartment both as primary sensors and as single or dual contact arming sensors. They can also be combined by placing two sensors within a single housing and, in some cases, the same mass can be used for both sensors. Finally, they can be used in electro-mechanical and in all mechanical air bag systems. It is further taught that the response of all spring biased sensors can be improved by making the at rest bias substantially less than the bias at actuation.

18 Claims, 17 Drawing Sheets

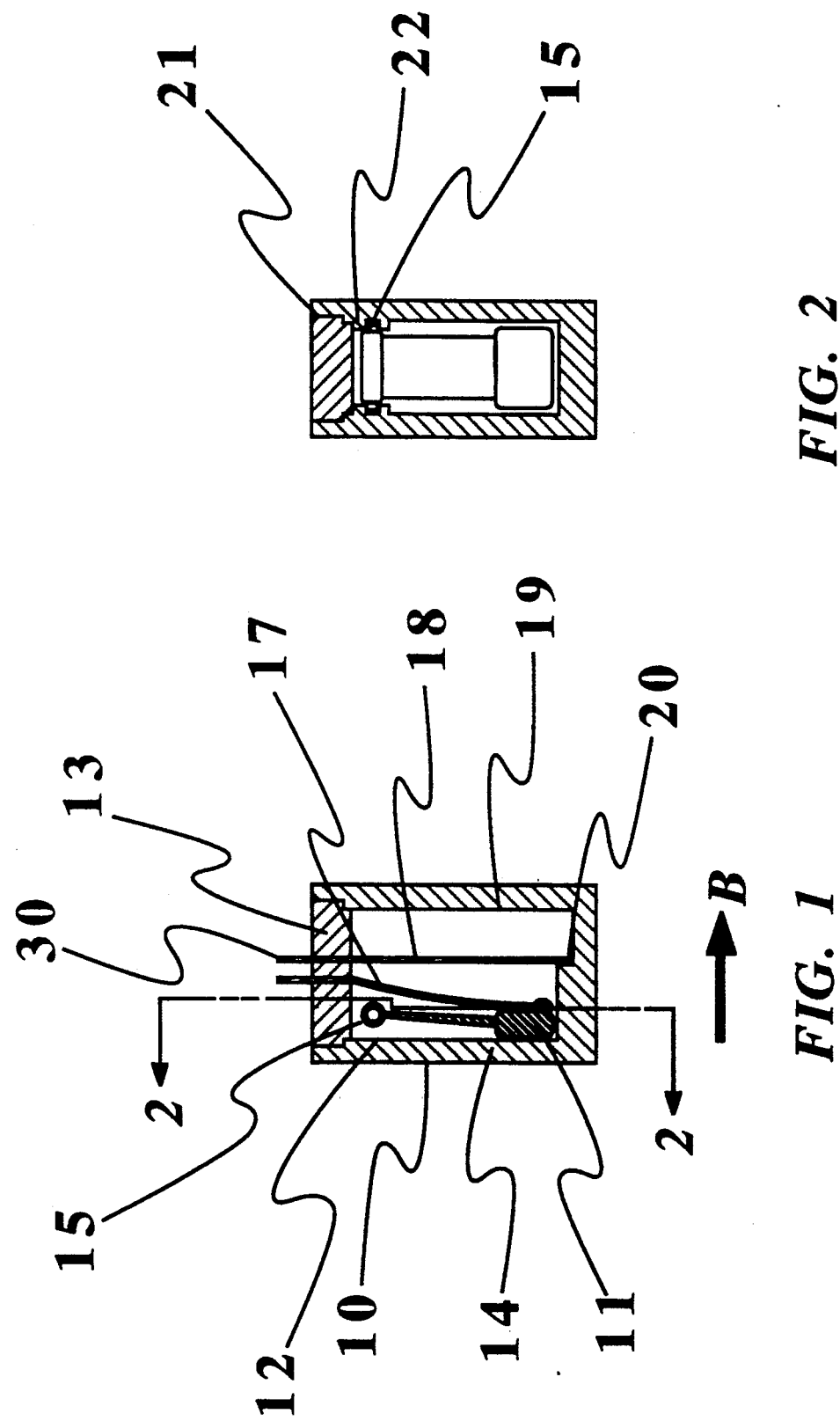

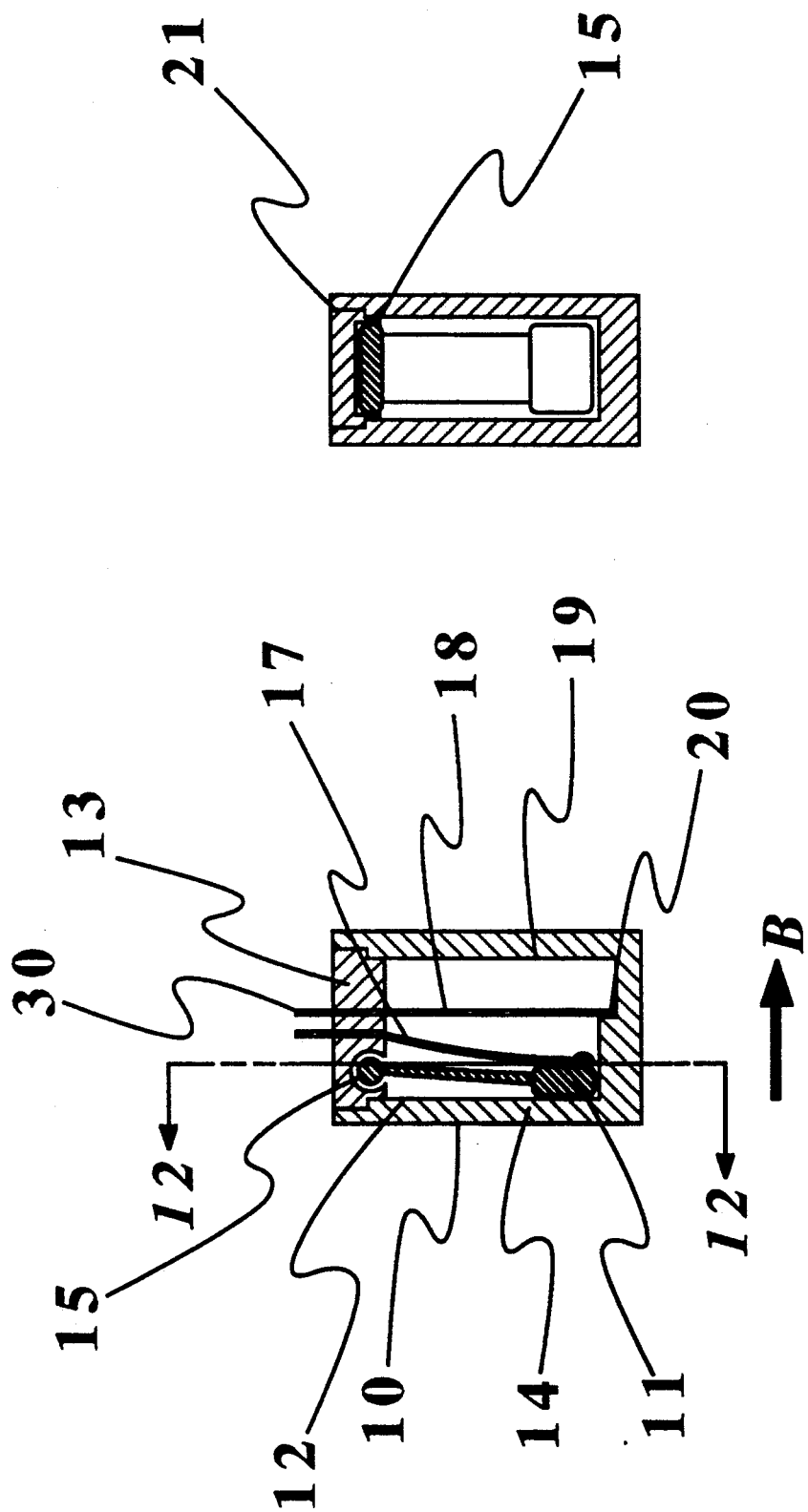

BALL-IN-TUBE PO53_74 SENSOR PERFORMANCE

| SCALED VELOCITY | SCALED PULSE PERIOD RELATIVE TO BARRIER | | | | | | |
|---|---|---|---|---|---|---|---|
| | 1.0 | 1.2 | 1.4 | 1.6 | 1.8 | 2.0 | |
| 8 MPH | NT | NT | NT | NT | NT | NT | |
| 10 MPH | NT | NT | NT | NT | NT | NT | |
| 12 MPH | NT | NT | NT | NT | NT | NT | |
| 14 MPH | 4.5/10.9 | NT | NT | NT | NT | NT | |
| 16 MPH | 2.8/8.7 | 7.1/14.7 | NT | NT | NT | NT | |
| 18 MPH | 1.6/6.8 | 5.2/12.5 | NT | NT | NT | NT | |
| 20 MPH | 0.8/5.0 | 2.6/8.3 | 4.9/11.6 | NT | NT | NT | |
| 22 MPH | 0.8/5.2 | 1.1/5.5 | 4.4/11.2 | 7.1/14.9 | NT | NT | |
| 24 MPH | 0.7/5.2 | 0.9/5.3 | 1.5/6.0 | 7.0/15.1 | NT | NT | |
| 26 MPH | 0.6/5.3 | 0.9/5.3 | 1.2/5.7 | 3.9/10.3 | 6.4/13.9 | NT | |
| 28 MPH | 0.5/5.3 | 0.8/5.4 | 1.0/5.4 | 1.5/6.1 | 6.3/14.0 | 8.5/16.7 | |
| 30 MPH | 0.5/5.5 | 0.7/5.4 | 0.9/5.4 | 1.4/6.0 | 1.9/6.7 | 9.0/17.8 | |
| 32 MPH | 0.5/5.7 | 0.7/5.5 | 0.9/5.6 | 1.1/5.6 | 1.6/6.4 | 2.4/7.3 | |
| 34 MPH | 0.4/5.8 | 0.6/5.6 | 0.8/5.6 | 1.0/5.6 | 1.5/6.2 | 2.0/6.9 | |

*FIG. 13*

SPRING-MASS NON-CRUSH ZONE SENSOR PERFORMANCE

SCALED PULSE PERIOD RELATIVE TO BARRIER

| SCALED VELOCITY | 1.0 | 1.2 | 1.4 | 1.6 | 1.8 | 2.0 |
|---|---|---|---|---|---|---|
| 8 MPH | NT | NT | NT | NT | NT | NT |
| 10 MPH | NT | NT | NT | NT | NT | NT |
| 12 MPH | NT | NT | NT | NT | NT | NT |
| 14 MPH | 4.3/10.7 | NT | NT | NT | NT | NT |
| 16 MPH | 0.6/3.9 | 3.9/9.9 | NT | NT | NT | NT |
| 18 MPH | 0.5/3.9 | 0.8/4.1 | 10.9/19.6 | NT | NT | NT |
| 20 MPH | 0.4/4.0 | 0.6/4.0 | 1.1/4.8 | 3.3/8.4 | NT | NT |
| 22 MPH | 0.4/4.1 | 0.6/4.0 | 0.8/4.2 | 3.3/8.8 | 3.7/8.9 | NT |
| 24 MPH | 0.4/4.3 | 0.5/4.1 | 0.7/4.2 | 1.0/4.6 | 3.8/9.3 | NT |
| 26 MPH | 0.3/4.4 | 0.5/4.2 | 0.6/4.2 | 0.8/4.4 | 3.9/9.8 | 4.7/10.7 |
| 28 MPH | 0.3/4.6 | 0.4/4.3 | 0.6/4.3 | 0.8/4.5 | 1.0/4.6 | 4.8/11.1 |
| 30 MPH | 0.3/4.7 | 0.4/4.4 | 0.6/4.4 | 0.7/4.5 | 0.9/4.7 | 1.2/5.0 |
| 32 MPH | 0.3/4.9 | 0.4/4.5 | 0.5/4.5 | 0.7/4.6 | 0.9/4.8 | 1.1/5.0 |
| 34 MPH | 0.3/5.0 | 0.4/4.7 | 0.5/4.5 | 0.7/4.6 | 0.9/4.9 | 1.1/5.1 |

*FIG. 14*

SPRING MASS PASSENGER COMPARTMENT CRASH SENSORS

This application is a continuation-in-part of copending application Ser. No. 07/480,273 filed Feb. 15, 1990; a continuation-in-part of copending application Ser. No. 07/480,257 filed on Feb. 15, 1990; continuation-in-part of application Ser. No. 07/480,271 filed Feb. 15, 1990, now U.S. Pat. No. 5,155,307; a continuation-in-part of Ser. No. 07/686,717, filed Apr. 17, 1991, now abandoned; which is a continuation in part of application Ser. No. 07/314,603, filed Feb. 23, 1989, now abandoned.

This application is also related to U.S. Pat. No. 4,580,810 to Thuen.

BACKGROUND OF THE INVENTION

This invention is a new simplified design of crash sensors for use with vehicle passive restraint systems such as air bags. In the above cross referenced patent applications, it is disclosed that a crash sensor can be constructed with a configuration of a square or rectangular flapper swinging inside a closed passage. It is also disclosed that such sensors can be made of plastic by a molding process. This present invention provides further simplifications and improvements on the previous designs and in particular with regard to undamped spring mass sensors for mounting in the passenger compartment and their use in a sensor system. This invention is also an improvement of above referenced U.S. Pat. No. 4,580,810 of Thuen and the entire contents of that patent are hereby included herein by reference. This patent disclosed an all mechanical air bag system using an air damped sensor. The present invention solves certain newly discovered problems of this all mechanical air bag system as explained below.

During a crash and in particular at the time that a crash sensor must decide whether to trigger the deployment of a passive restraint system such as an air bag, a vehicle can be divided into two parts; the crush zone which is that portion of the vehicle which has substantially changed its velocity and the non-crush zone which is the remainder of the vehicle. In a typical 30 MPH barrier crash, for example, the crash sensor must trigger deployment of the air bag in about 20 milliseconds for a typical full size American car. At this time the vehicle has typically crushed about 10 to 12 inches measured from the point on the vehicle which first contacted the barrier. A sensor designed to sense a crash in the crush zone will typically require a velocity change of about 10 MPH to trigger while non-crush zone mounted sensors must typically trigger on a 2 to 4 MPH velocity change in a 30 MPH barrier crash.

Crush zone sensors are typically mounted on the radiator support while non-crush zone sensors are typically mounted in the passenger compartment on the firewall, under the seat, or on the transmission tunnel, for example. In particular, crush zone sensors are usually mounted on the front surface of the radiator support and are actuated when struck by crushed materials which are forced rearward in the crash by the object being struck. For this reason, a crush zone sensor must be sufficiently large so that it will be struck by the crushed material with a high probability. A very small sensor, such as disclosed in this invention, could not be used in the crush zone since folds, wrinkles and voids in the crushed material could span the sensor delaying its functioning. Crush zone sensors typically project as much as 2 inches in front of the radiator which increases the response time of the sensor by about 4 milliseconds in a 30 MPH barrier crash. Since the radiator is frequently on the border of the crush zone for many crashes, this forward projection and resulting faster response time sometimes becomes important. If the sensor were small and were projected forward on a special bracket, for example, it would run the risk of being missed by the crushed material or of being rotated if not hit squarely. A prime advantage of spring mass sensors, particularly of the cantilevered and hinged mass type, is that they can be made very small which is of no value for crush zone applications but very useful for non-crush zone or passenger compartment mounting locations. Also, since the non-crush zone mounted sensor will not be impacted during the crash, it does not have to be protected by a metal can. It can be mounted on a printed circuit board for example and the sealing requirements are much less severe. For a more detailed discussion of the differences in crush zone and non-crush zone sensing, refer to Breed, D. S. and Castelli, V., *Problems in Design and Engineering of Air Bag Systems*, SAE Paper No. 880724 which is included herein by reference.

Crash sensors can be divided into three categories depending on their mounting location and intended function. Crush zone and non-crush zone mounted discriminating sensors determine that the vehicle is in a crash and that the restraint system should be deployed. Usually a sensor system also has an arming or safing sensor which functions to validate that the whole vehicle is decelerating at a rate in excess of that which accompanies braking. This is to prevent a momentary hammer blow on the crush zone sensor, for example, from deploying the air bag.

Spring mass sensors have been designed for use both in the crush zone and in the non-crush zone. However, for a variety of reasons arising out of the severe vibration environment, spring mass sensors have not proven successful for crush zone locations whereas they have had some limited success for non-crush zone locations particularly for arming or safing sensor applications where the sensor accuracy is not critical. Spring mass sensors of the flat spring cantilevered type, such as disclosed in U.S. Pat. No. 4,249,046, have been designed for the crush zone but not for the non-crush zone where round spring cantilevered sensors have been attempted. One reason that spring mass sensors are seldom used as discriminating sensors in the non-crush zone is that if they are not carefully designed, they can trigger late particularly in soft crashes. A more important reason, which has not been appreciated until now, is that most spring mass sensors, and particularly the cantilevered type, are sensitive to cross-axis vibrations which has now been shown to have a significant effect on the calibration of most electro-mechanical sensors. The focus of this invention is to provide both non-crush zone mounted spring mass discriminating and arming sensors of the hinged mass type which are insensitive to cross axis vibrations and which are primarily used in conjunction with crush zone mounted discriminating sensors.

The all mechanical air bag system (AMS) as disclosed in above referenced U.S. Pat. No. 4,580,810 uses an air damped ball-in-tube sensor which has recently also found to be significantly affected by cross axis vibrations. This sensitivity to cross axis vibrations was one factor causing a major automobile manufacturer to use an self contained air bag system employing an electronic sensor instead of the system of U.S. Pat. No. 4,580,810. Another focus of this invention, therefore, is to eliminate this sensitivity to cross axis vibration for AMS systems.

Current non-crush zone or passenger compartment mounted crash sensors can be classified into three categories: spring-mass, electronic, and damped. This invention is in primarily in the first category, however some aspects may be applicable to damped sensors as well. A sensing mass in the shape of a flapper is disclosed in the aforementioned cross referenced patent applications. The flapper, which is described below, is coupled with and arranged to move in a housing. The flapper is biased by a spring or magnet toward a first position in the housing. When the sensor is installed at an appropriate location on a vehicle and a crash occurs, the flapper moves toward a second position in the housing. If the crash pulse is of enough magnitude and duration, an electrical circuit is closed to initiate deployment of the protection apparatus associated with the sensing device. During the motion of the flapper, gas is forced to flow through the gap between the flapper and the housing which imparts a damping force on the motion of the sensing mass. This damping results in a fast acting sensor which is exceeded in response time only by some electronic sensors. In many applications, especially when the vehicle occupants are wearing seat belts or where the sensor serves as a backup to crush zone crash sensors, a slight delay in triggering can be tolerated and the damping disclosed in the previous patent applications can be eliminated resulting in a sensor which is simpler and less expensive to manufacture and where the sensing mass no longer must have a planar shape.

The configuration of some of the sensors disclosed in the above referenced patent applications consists of a rectangular flapper in a rectangular housing. A flapper, which is the mass for sensing the acceleration of the crash, is a planar member having a thickness in the sensing direction which is much less than its width or height and is arranged to rotate relative to the housing. The flapper is coupled with the housing by a thin hinge on the edge of the flapper, by a knife edge support or other means. The axis of the housing is parallel to or aligned with the desired crash detecting direction. For example, if the sensor is to be used for frontal impact sensing, the sensor should be installed to have the axis of the housing approximately parallel to the front-rear direction of the vehicle. The flapper is arranged to rotate along an axis perpendicular to the axis of the housing.

The electro-mechanical version of the sensor (EMS) of the present invention differs from the prior art in that the damping has been eliminated. The sensing mass is biased by, but not supported by, a cantilevered beam contact and does not necessarily have the flat rectangular or circular shape of the previous inventions. In this manner the simplest configuration results. In the preferred configuration, it is supported by a rod, interlocking hinge or by pivots. The all mechanical version (AMS) is similar except the biasing spring is not a contact and a firing pin is released in response to a rotation of the sensing mass.

Some previous designs of simple spring mass sensors as shown, for example, in U.S. Pat. No. 4,262,177 of Paxton et al, have used a wire for the mass support with the result that the sensing mass was responsive to cross-axis accelerations. The sensor disclosed in Paxton is also sensitive to lateral velocity changes which can result in an air bag deployment even though the longitudinal velocity change is below the deployment threshold. This event could happen, for example, in a side impact when the struck car exhibits a small forward velocity change. Such a deployment could result in the air bag not being available for protecting the occupant in a subsequent accident. Air bags are designed to cushion the forward impact of an occupant with the passenger compartment and the decision to deploy the air bag should not be affected by lateral accelerations or velocity changes.

Cross-axis accelerations are those accelerations perpendicular to the preferred motion of the sensing mass. For example, for a vehicle crash sensor for sensing frontal crashes, cross-axis accelerations would be in the vertical and lateral directions. One implementation of the present invention uses a flat beam or other construction as the first contact and to bias a pivoted sensing mass. This construction is superior to all other spring mass sensors except the flapper designs disclosed in the above referenced patent applications, in resistance to cross axis vibrations. The importance of cross axis vibrations has not been appreciated by those designing spring mass sensors and partially explains why the flapper design has not been used for passenger compartment mounted sensors. Particular attention must be paid to the support of the mass to render motion of the mass insensitive to cross axis vibrations which is a key feature of the flapper sensors and of the sensors of this invention.

Recent studies have shown that cross axis vibrations with magnitudes up to 80 to 90 G's are common in marginal crashes in the crush zone and up to 40 to 50 g's in the passenger compartment. For these marginal crashes, the average longitudinal acceleration in the crush zone is three to four times the value in the passenger compartment. Thus, cross axis vibrations are relatively more significant in the passenger compartment and the sensor design must take this environment into account to prevent performance deterioration.

The particular effect of cross axis vibrations on electro-mechanical sensors depends on the sensor type. These vibrations cause the ball in ball-in-tube sensors, such as disclosed in Breed U.S. Pat. No. 4,329,549 and Thuen U.S. Pat. No. 4,580,810, to orbit around inside the tube which can prevent the ball from rolling down the tube and result in sliding friction which can decrease the sensitivity of the sensor by 20% or more. This increases the risk of a late air bag deployment and injury to an occupant who has become out-of-position due to the crash, or of no deployment when an air bag is required. Also, these sensors have been shown to trigger on cross axis vibrations alone even in the absence of a longitudinal pulse.

Other sensors which have sliding masses similarly can be significantly influenced by increased friction forces. Still other sensors have masses which exhibit complicated vibratory motions when subjected to cross axis vibrations which can result in a late deployment or intermittent contact closures causing either an unwanted or a late deployment. For a further discussion of cross axis vibrations, refer to Breed, D. S. and Castelli, V., *Are Barrier Crashes Sufficient for Evaluating Air Bag Sensor Performance*, SAE Paper No. 900548, and Breed, D. S. and Castelli, V. *A New Automobile Crash Sensor*

*Tester*, SAE paper No. 910655, which are included herein by reference.

Other attempts have been made to construct a spring mass sensor using a cantilevered beam. Representative of such efforts is a sensor construction disclosed in U.S. Pat. No. 4,249,046 of Livers et al, which describes a crush zone mounted sensor which, as discussed above, is required to be large in order to interact with the crushed material in the crush zone; This sensor differs from this invention in that it is intended for mounting in the crush zone; it is thus considerably larger and more complicated; the mass is not separately supported but is attached to the cantilevered beam rendering it sensitive to cross axis vibrations; and, the secondary contact is constructed in such a manner as to also render it sensitive to both cross axis and longitudinal shocks and vibrations. The sensors of this invention are intended for non-crush zone mounting; the sensor is very small; the sensing mass is separately supported; and, the design of the secondary contact, for the EMS case, is such as to also render it insensitive to cross axis vibrations. The motion of the secondary contact is also limited so that it cannot contact with the first contact when the sensor is subjected to shock and vibration unless the first contact moves the required distance.

The fact that cantilevered mass sensors are particularly sensitive to cross axis vibrations was not understood until the recent development of testing equipment which can simultaneously subject a sensor to both longitudinal accelerations and cross axis vibrations of the magnitudes found in crashes. During tests on an optimized cantilevered mass sensor, the unbalance in the mass relative to the cantilever mounting caused severe torsional vibrations which, in some cases, even caused the sensor to trigger from cross axis vibrations alone. This occurred even though that sensor was particularly designed to minimize this sensor unbalance and thus to minimize this effect.

The parts of the EMS sensor of this invention can be manufactured by the plastic injection molding processes in which both contact assemblies are insert molded into the housing in a single operation. A near hermetic seal is obtained using the metal treatment process disclosed in the above referenced patent applications and below.

In U.S. Pat. No. 4,580,810, it is mentioned that the placement of the sensor outside of the inflator housing results in a larger and heavier sensor due to the requirement that the sensor housing must be sufficiently strong to withstand the pressures of the burning propellant. This problem can be solved, as mentioned in that patent, by placing the entire sensor within the inflator housing. It can also be solved by placing the primer within the inflator which is impacted by the firing pin through a small hole. The small amount of propellant which leaks back through the firing pin hole can be made insignificant through the choice of hole size and firing pin spring.

It has also been found that the AMS sensor need not be mounted on the steering wheel axis, as taught in the above referenced patent, as long as the sensor is so mounted that vibrations caused by impacts to the steering wheel rim are weekly coupled to the sensor.

SUMMARY OF THE INVENTION

The object of this invention is a very small and simple spring mass sensor of the pivoted mass type for mounting in the passenger compartment and uses a geometry which is uniquely suited for eliminating the effects of cross axis vibrations on the sensor response. Spring mass, for the purposes of this invention, means that the primary force opposing the motion of the sensing mass is non-dissipative or mostly conservative. A spring is the simplest form of such a force but a magnet could also be used. This sensor is intended for use in conjunction with crush zone sensors or in those cases where the vehicle occupants are expected to wear seat belts.

It is a primary objective of this invention to provide a new and reliable design for spring mass type crash sensors for mounting in the passenger compartment which is very inexpensive to manufacture.

It is another objective of this invention to provide crash sensors which are insensitive to cross-axis vibrations.

An additional object of this invention is to provide a spring mass sensor construction which has a comparable speed of response to crashes as damped sensors.

A further object of this invention is to provide a construction which permits one housing to house two sensors usually of different calibrations.

Still another object of this invention is to provide a construction which permits a single sensing mass to be used for both the arming and discriminating sensor functions.

Yet another object of this invention is to provide a very inexpensive sensor system comprising at least two crush zone sensors coupled with a passenger compartment mounted discriminating sensor and a passenger compartment mounted arming sensor.

It is also an objective of this invention to manufacture the major parts of the crash sensor by an insert molding process.

It is still another objective of this invention to make crash sensors which are insensitive to temperature variations.

Another object of this invention is to minimize vibrations of the contacts by adding a layer of damping material to the contact surface.

Yet another object of this invention is to provide for an all mechanical air bag system which is insensitive to cross axis vibrations.

A further object of this invention is to provide an all mechanical air bag system which permits the use of existing electrically actuated inflator designs with minor modifications.

An additional object of this invention is to provide an all mechanical air bag system where the sensor does not have to be mounted on the axis of the steering wheel.

Other objects and advantages this invention will become obvious from the discussion below.

BRIEF DESCRIPTION OF THE DRAWINGS

FIG. 1 is a cross section view of a spring mass arming or passenger compartment discriminating sensor containing integral molded contacts.

FIG. 2 is a cross section view taken along lines 2—2 of FIG. 1.

FIG. 11 is a cross section view of a spring mass arming or passenger compartment discriminating sensor similar to FIG. 1 but with an alternate mass support structure.

FIG. 12 is a cross section view taken along lines 12—12 of FIG. 11.

FIG. 13 is a matrix of computer simulation results showing the performance of a currently produced ball-in-tube passenger compartment mounted discriminating sensor having the designation of P053.

FIG. 14 is a matrix of computer simulation results showing the performance of a passenger compartment mounted discriminating sensor of this invention having the equivalent response to barrier crashes as the ball-in-tube sensor of FIG. 13.

DETAILED DESCRIPTION OF PREFERRED EMBODIMENTS

Figure 3:
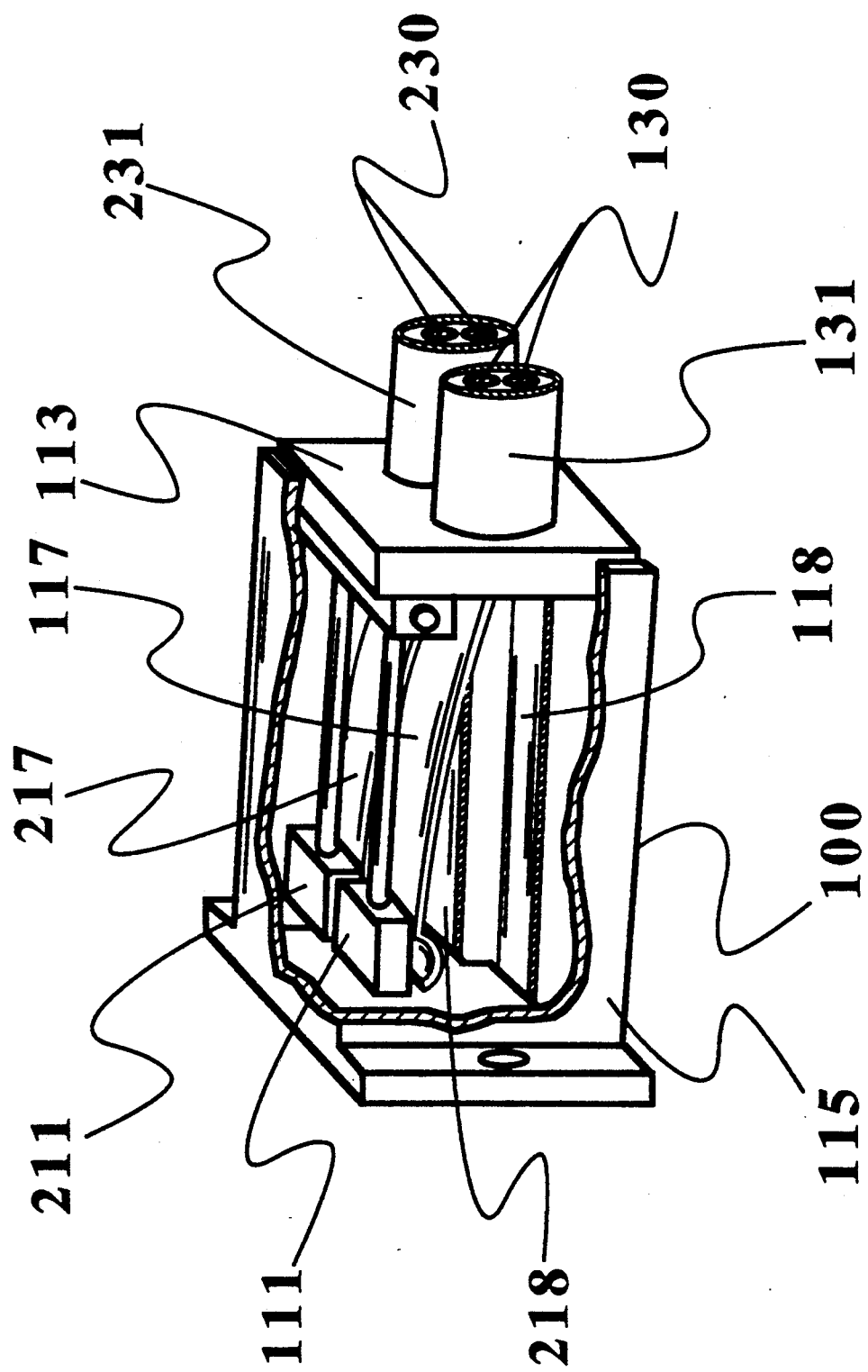
FIG. 3 is a perspective view of a dual sensor containing both arming and discriminating sensors in the same housing.

A preferred embodiment of this invention is manufactured as a short housing with a length in the sensing direction of about 0.6 inch, a width of about 0.5 inches and a height of about 1.1 inch. FIG. 1 shows a cross sectional view of such a passenger compartment mounted sensor 10. An inertial mass 11, initially rests on surface 12 and is supported by and held against surface 12 by a biasing force from a cantilevered contact beam 17 which is insert molded so that it extends through housing top 13. The mass 11 is held in housing 14 by pivot rod 15 and extensions 22 of top 13.

The housing is molded as a substantially rectangular box 14 with a top 13. The contact beam 17 can be attached to housing top 13 on an angle so as to bias the mass 11 toward its initial position. The portion of beam 17 which is outside of the housing is later bent so that it can be easily attached to a wire, a printed circuit board or other apparatus. Alternately, the beam can be prebent so that it passes straight through the top 13 as shown in FIG. 1. A second contact 18 is also fixed to the housing 13 by insert molding. When installed on a vehicle, the right side of the sensor faces the front of the vehicle in the direction of arrow B.

When the sensor is subjected to a crash pulse of sufficient magnitude and duration, the mass moves contact 17 toward contact 18. After a specified travel, the contact 17 engages contact 18 and closes an electrical circuit to initiate the deployment of the protection apparatus associated with the sensing system. The first contact 17 is allowed to deflect further beyond the triggering position until it is stopped by contact 18 when contact 18 reaches wall 19 of the housing. This over travel is necessary in order to provide a long contact duration or dwell for reliable initiation of the primer or squib in the gas generator in an air bag system, for example. If the acceleration of the crash pulse drops below the bias level later in the crash, the mass 11 moves back toward its initial position due to the biasing force of contact 17.

Contact 17 and contact 18 along with housing top 13 can all be produced as a single piece by insert injection molding. A candidate for the contact material with well known conductive and elastic properties is beryllium copper although copper plated steel, Spinodal, beryllium nickel or other metals can be used. In most cases, the area of contacts 17 and 18 which touch each other during activation will also be plated with gold to reduce the contact resistance.

The housing top 13 is assembled to the housing 14 and sealed in place at joint 21 by any of several known processes such as heat sealing, ultrasonic welding, solvent or adhesive gluing, completing the assembly. In one design, surface 12 of housing 14 is slightly tapered from top to bottom. This permits an adjustment during assembly to eliminate tolerance effects by moving top 13 in or out of the housing 14 to place the mass 11 and contact 17 closer or further from contact 18. However, for most applications this adjustment is not necessary since the calibration of the sensor is primarily determined by the travel of mass 11 which is fixed by the relative position of stop 20 and wall 12 and by the thickness of mass 11. These dimensions can be accurately controlled in the mold design and the production processes. Wires 30 connect the sensor to other instrumentality.

Mass 11 can be constructed from plastic or metal by either a die casting, stamping or forming process. If mass 11 is constructed from plastic, an additional metal weight can be added. The equivalent linear motion of the center of mass from rest to sensor triggering is fixed in spring mass sensors by the desired response curve. Since this mass motion is accomplished by a rotation of mass 11, the size of the sensor in the sensing direction is determined by the point on the mass 11 which is furthest from the pivot point. For this reason, in order to result in the smallest sensor, it is important to place the center of mass of mass 11 as far from the pivot point as possible which contrasts with the flapper designs disclosed in the cross referenced patent applications. In particular, the center of mass will always be greater than 50% of the distance from the pivoted end to the free end. Also, since this sensor is undamped, greater energy is available to establish good electrical contact and thus a smaller mass is possible.

Using an appropriate metal to plastic adhesive coating on the metal, the metal parts 17 and 18 and the plastic top 13 can be bonded so as to maintain a seal throughout the operating temperature range of the sensor as described below. Although this is not a true hermetic seal in the sense that the term is used in the manufacture of light bulbs, for the purposes of this invention it will be referred to as an hermetic seal since the gas diffusion rate through the seal is very low.

Figure 10:
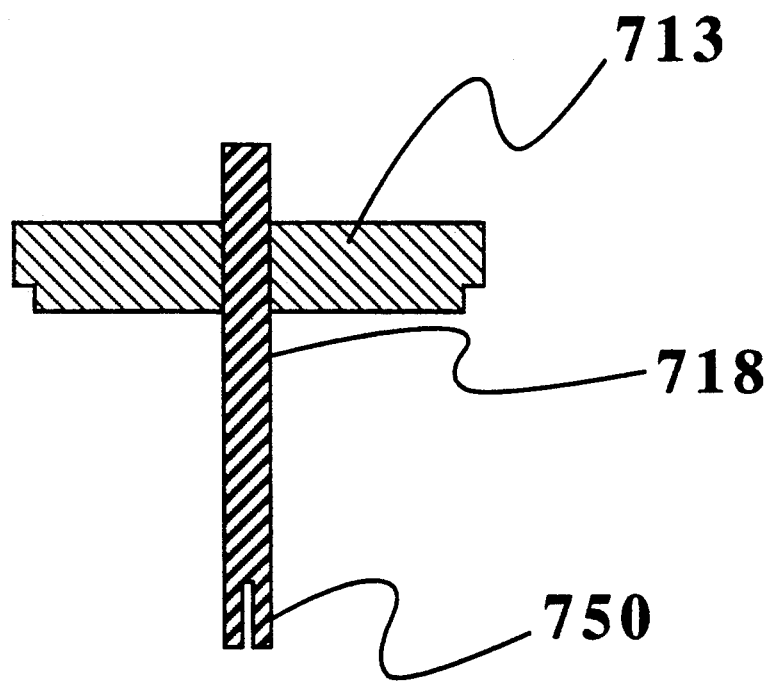
FIG. 10 is a cutaway view of a second contact and top of housing showing the bifurcated nature of the contact end.

A step 20 is provided in the housing 14 to serve as a stop for contact 18. This prevents the contact 18 from deflecting and prematurely contacting contact 17 due to shock or vibration. The end of contact 18 can be bifurcated as is contact 718 with fingers 750 as shown in FIG. 10 or contact 17 can be curved as shown in FIG. 1 and bifurcated. Either method improves contact reliability.

The motion of the mass is determined only by the bias and the inertial force caused by the crash. Since there is no damping, a large clearance exists between the mass and housing with the result that there are no difficult to manufacture tight clearances.

FIG. 2 is a cross section view of the sensor of FIG. 1 taken along lines 2—2.

The sensor sensitivity to velocity change, commonly known as the sensor response curve, is determined by the bias level and the travel distance of the mass before contact occurs. A computer program simulating the motion of the mass is used to analyze and determine the appropriate dimensions and the bias level. The bias level for passenger compartment mounted sensors is typically about 5 to 10 g's for discriminating sensors and 1 to 4 g's for arming or safing sensors. One fact that has not previously been appreciated is that the sensor performance can be optimized by adjusting the variation of bias with travel. It is known that, in general, damped sensors respond faster than spring mass sensors having the same response curve. This speed advantage can be overcome, however, if the spring-mass sensor has a bias which starts at the proper level and increases at the proper rate. FIG. 13 shows a sensor response matrix for an existing ball-in-tube sensor having a magnetic bias. For a full explanation of this methodology. refer to the paper by Breed, D. S. and Castelli, V. *Trends in Sensing Frontal Impacts*, SAE Paper No. 890750, which is included herein by reference. FIG. 14 is a similar matrix of a spring mass sensor designed according to the teachings of this invention where the bias contact 17 has been prebent to give a bias which begins at 4 g's and increases to 12 g's at closure.

This low initial bias permits the mass to get a "head start" in soft crashes where the deceleration is slow to build up in the non-crush zone. In magnetically biased ball-in-tube sensors, on the other hand, the bias starts out high and decreases and thus the mass will not start moving until the maximum bias is overcome. In the spring biased ball-in-tube sensors which are on the market, the bias is almost constant during the ball travel. For this invention, it has been found that the bias should start out at least at 50% of its value at contact for this "head start" effect to be significant. From these two figures, it can be seen that the response of the two sensors are similar for barrier crashes (column 1.0), while the spring-mass sensor has a significantly better response to longer pulses. Now that this fact is known, some ball-in-tube and other sensors can take advantage of this "head start" effect to achieve better performance.

FIG. 3 depicts a dual sensor construction 100, where both a discriminating sensor 110 and an arming sensor 210 are mounted in the same housing 115. A mass 111 with contact 117 is arranged to move in a housing 115 to form part of the discriminating sensor and mass 211 with contact 217 partially forms the arming sensor. Contacts 117 and 118 and contacts 217 and 218 will close an electrical circuit if the mass moves to a specified position as in FIG. 1. The bias force on the mass 211 created by beam 217 is typically about 2 g's and is less than the bias force on mass 111 created by beam 117. Also the travel of mass 111 is typically about 0.12 inch and is more than the travel of mass 211 which is typically about 0.09 inch. Both the travel and bias of the sensors is set based on computer modeling so that the sensors have the proper response during a crash of the vehicle. These values will depend on the threshold triggering policy of a particular automobile manufacturer and thus will vary somewhat from one system design to another. In the example shown in FIG. 3, the contacts 117 and 217 are prebent to create the required bias and then insert molded into top 113. Wires 130 and 230 are attached to the contacts as they emerge from top 113 by any convenient means and then covered with an insulator such as shrink tubing 131 and 231.

Figure 4:
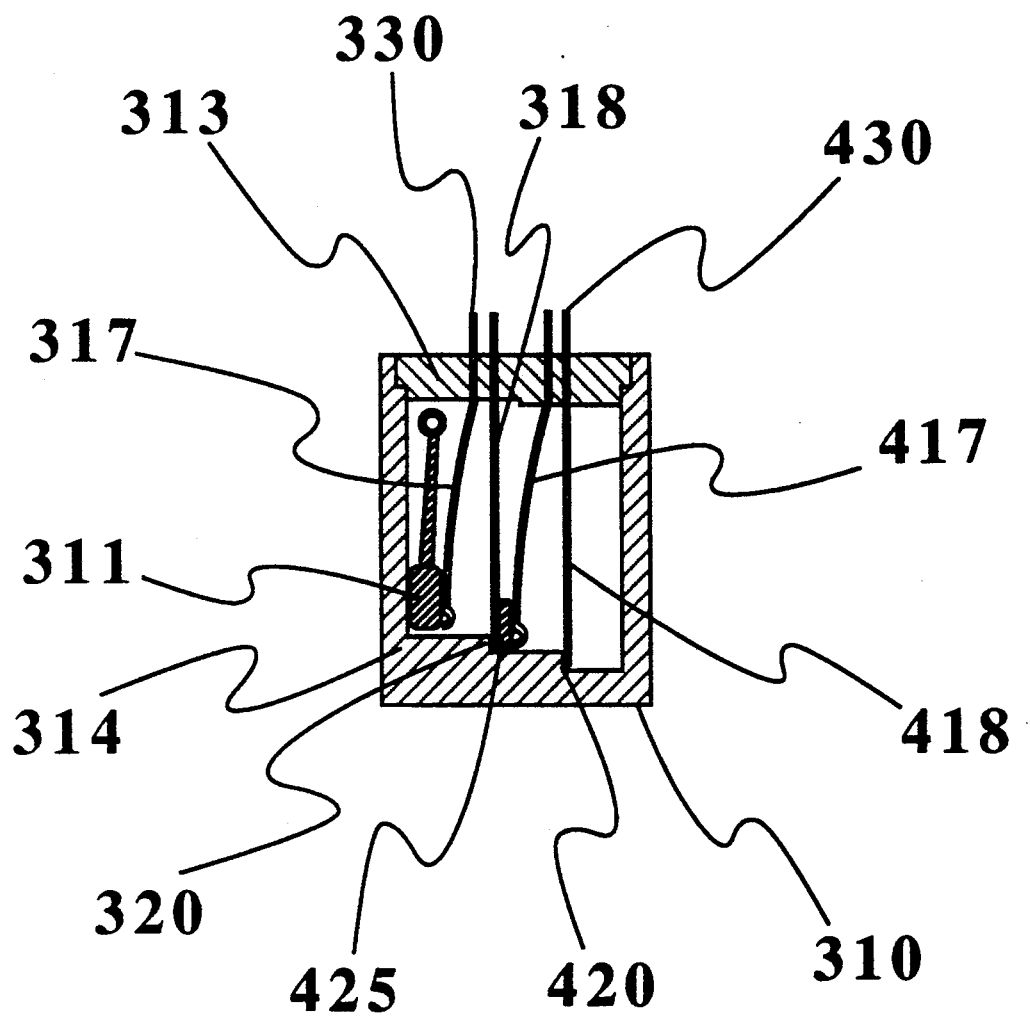
FIG. 4 is a cross section view of a dual sensor containing both arming and discriminating sensors in the same housing with the same mass used for both sensors.

FIG. 4 shows another preferred embodiment 310 where both the arming and discriminating sensor functions are housed in one housing 314 and use the same mass 311. In this case mass 311 is initially biased by beam contact 317 until it makes contact with contact 318 at which point the bias increases as contact 417 begins bending until it makes contact with contact 418. This sensor has the advantage that overlap is assured between the arming sensor and the discriminating sensor mounted in the passenger compartment. Two stops 320 and 420 are now provided to prevent vibration of contacts 318, 417 and 418 respectively from causing premature closure. Stop 320 also permits an initial deflection in contact 417 so that the higher bias required for the discriminating sensor is rapidly achieved as the mass begins deflecting contact 417. Contact 417 is electrically insulated from contact 318 by a pad of insulating material 425. Contacts 317, 318, 417 and 418 are sealed as they pass through top 313 after which they are connected to wires 330 and 430 which lead to other instrumentality.

Originally the concept of an arming or safing sensor was to require that two different sensors located in different parts of the vehicle close before a passive restraint such as an air bag is deployed. It is now common to place both the passenger compartment arming and discriminating sensors in the same package. The sensor depicted in FIG. 4 goes one step further and both functions are combined into a single sensor with one sensing mass.

Figure 5:
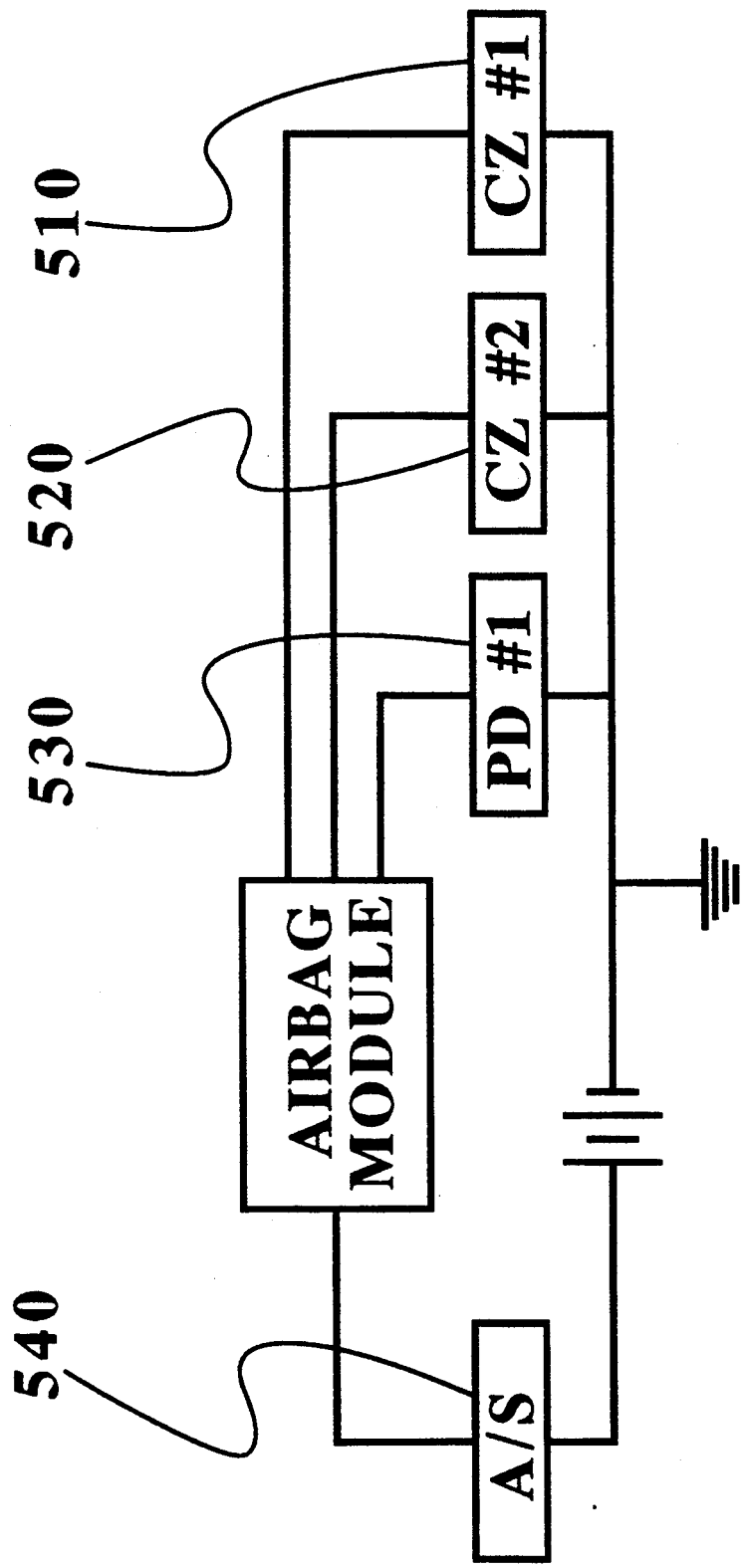
FIG. 5 is a schematic of a sensor system composed of two crush zone mounted sensors plus a passenger compartment mounted arming sensor and a passenger compartment mounted discriminating sensor.

FIG. 5 is a schematic of a sensor system comprising two forward mounted crush zone crash sensors, such as the crush switch sensor depicted in Breed U.S. Pat. No. 4,995,639, plus a passenger compartment mounted discriminating sensor and a passenger compartment mounted arming sensor as disclosed in this application. Sensor systems in use today, in addition to a passenger compartment mounted arming sensor, typically have either multiple crush zone discriminating sensors; a single crush zone discriminating sensor in parallel with a passenger compartment discriminating sensor; or a single passenger compartment mounted discriminating sensor. In all cases when a passenger compartment discriminating sensor is part of the sensor system, it is used as a primary sensor for sensing crashes. In the sensor system shown in FIG. 5, on the other hand, the passenger compartment discriminating sensor is used primarily as a backup for those rare cases where the forward sensors fail to detect the crash properly or in time. This could be due to an undercarriage hangup accident where the crush zone sensors are not involved or in a high speed accident where a pole or other object impacts directly on the sensor and, for seismic sensors such as the ball-in-tube or spring mass crush zone mounted sensors, the mass can rebound or the sensor can rotate before the arming sensor has had time to close.

As can be seen in FIGS. 13 and 14, non-crush zone mounted sensors, such as those mounted in the passenger compartment, do not trigger in time on many soft crashes. This fact is not appreciated by the automobile industry where the current trend is toward a single electronic passenger compartment mounted electronic sensor. This trend stems from the policy of sensor designers to rely primarily on staged barrier or similar "hard" crashes. Soft crashes such as those modeled in FIGS. 13 and 14, on the other hand, are the most common real world crashes. In order to catch all air bag desired crashes, sensors are needed in both the crush and non-crush zone as depicted in FIG. 5.

It is known that simple electronic sensors have the potential of being the fastest acting sensors for a particular location and calibration and that damped sensors are slightly slower. Spring mass sensors can be slower yet but, as described above, if the bias force variation is properly designed it will trigger faster than currently produced damped sensors. Some electronic sensors with complicated algorithms can even be the slowest of all sensors due to the required processing time. For those accidents involving the undercarriage, the pulse will be sensed rapidly, and in most cases in time, by almost all non-crush zone sensors. The problem with the high speed pole crash case can be eliminated through the use of the crush switch sensors described in U.S. Pat. No. 4,995,639 where the contacts latch closed on an impact. The spring mass sensor of this invention has a faster response and is considerably more reliable and less expensive than currently used passenger compartment mounted electromechanical sensors due to its simplicity and lack of sensitivity to temperature and cross-axis vibrations.

One crash which deserves special attention, as one of the most difficult to detect, is the low pole crash. In this case, a low pole, such as a rock or tree stump, impacts the vehicle in such a manner as to cause seismic sensors, such as the ball-in-tube sensors, which are typically mounted high on the vehicle, to rotate and not trigger or trigger late. This problem is also solved by the tape switch crush switch sensors, such as disclosed in patent 4,992,639, and thus by the sensor system of FIG. 5 providing these are the crush zone sensors used.

At this time there are no systems on the market which have both multiple forward crush zone mounted sensors and a passenger compartment discriminating sensor. One car company uses exclusively crush zone discriminating sensors and therefore is subjected to the risk that the crush zone sensors will either be disabled by a rotation, for example, or not be in the crush zone in the case of an undercarriage hangup. In the first case, the air bag system will not deploy and in the second case it will deploy late. Both of these problems can be solved with the addition of a sensor designed for and mounted in the non-crush zone.

Another car company uses a single centrally mounted crush zone sensor with a passenger compartment mounted non-crush zone sensor. This system has a failure mode, for example, of triggering late on a low speed or long duration angle crash where the center crush zone sensor is not in the crush zone and the passenger compartment sensor triggers late. This system would be improved with the addition of crush zone sensors which are mounted closer to the side of the vehicle either in addition to, or as a replacement for, the center mounted crush zone sensor depending on the vehicle structure. The suggested enhancements would add additional cost to an already expensive system if conventional sensors are employed. However, if a combination of sensors as described in U.S. Pat. No. 4,995,639 for the crush zone with the sensors of this invention are used, the system would cost considerably less than either of the systems described above and does not have their failure modes. Such a system is therefore a considerable improvement in the state of the art of crash sensor systems and is made practical by the low cost and simplicity of the sensors described here.

In FIG. 5 crush zone sensors 510 and 520 and passenger compartment discriminating sensor 530 are all connected in parallel and the combination is connected in series with arming sensor 540. Thus if any one of the discriminating sensors plus the arming sensor trigger, the restraint system is deployed.

Figure 6:
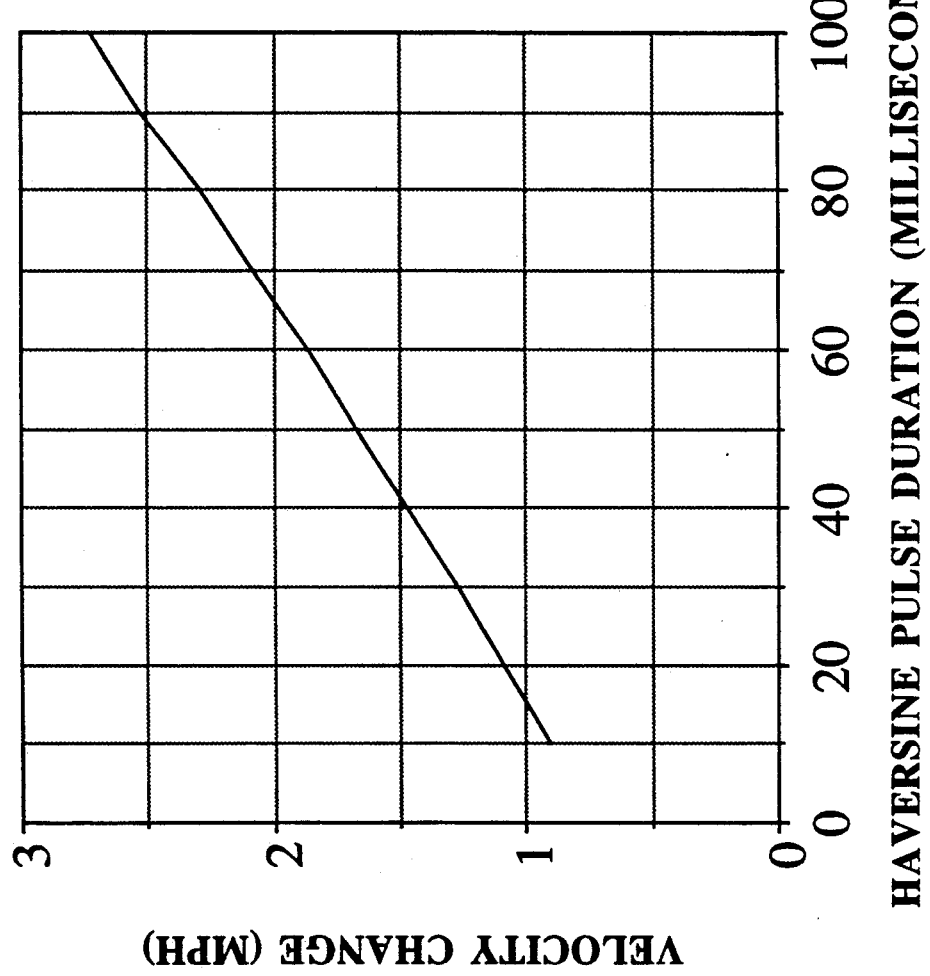
FIG. 6 is a plot showing the marginal response curve of a typical arming sensor of this invention when subjected to haversine pulses of different durations and velocity changes.
Figure 7:
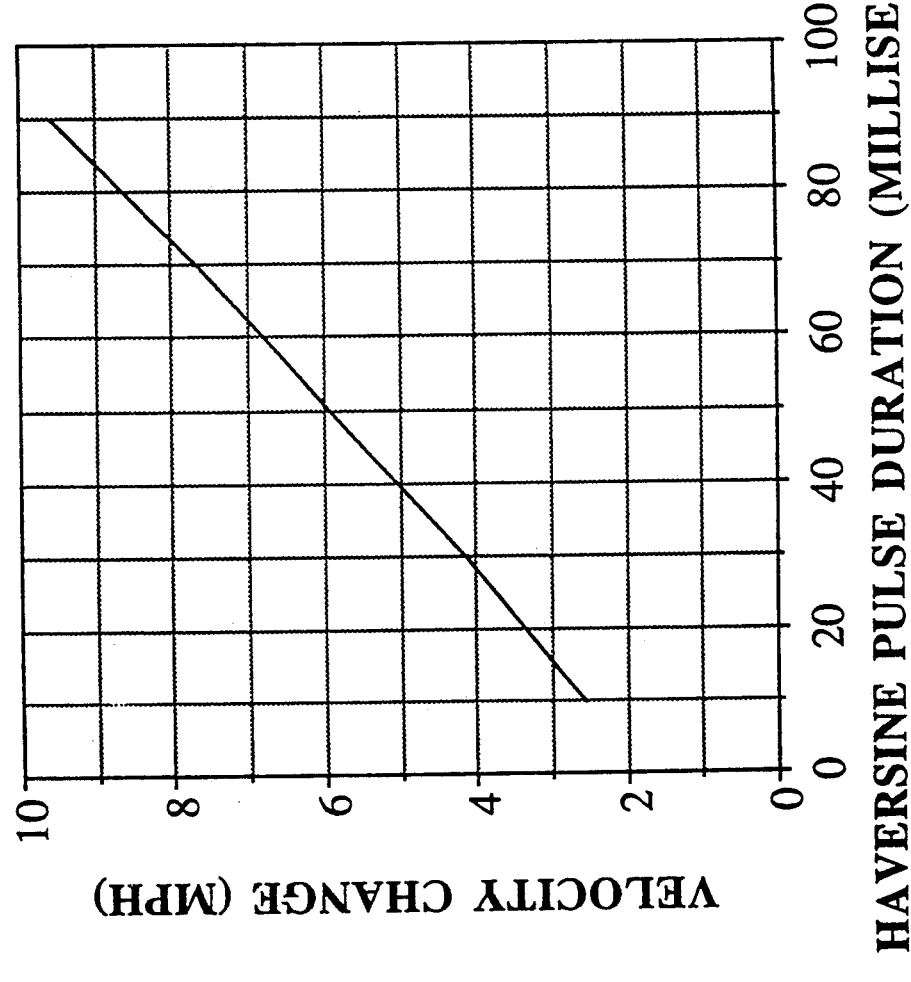
FIG. 7 is a plot showing the marginal response curve of a typical passenger compartment discriminating sensor of this invention when subjected to haversine pulses of different durations and velocity changes.

FIG. 6 shows a typical response curve of an arming sensor when subjected to a series of haversine acceleration pulses and FIG. 7 shown the corresponding response of a typical passenger compartment discriminating sensor as taught by this invention. In this representation, the curve is a plot of the marginal trigger/no trigger boundary for the sensor. The sensor will trigger for all haversine shaped pulses having a velocity change and a duration above the curve and will not trigger for all combinations which lie below the curve.

An example of a typical safing sensor designed according to the teachings of this invention for installation in the passenger compartment has the following parameter values:

Sensor Designation: A017.22
Mass dimensions=0.35 (wide)×0.25 (high)×0.18 (thick) inches
Travel=0.09 inches
Bias beam length=0.850 inches
Bias beam width=0.144 inches
Bias beam thickness=0.003 inches
Over travel=0.18 inches
Mass=2 grams Bias beam Material=BeCu

| Bias: | Force gms | Deflection |
|---|---|---|
| Initial | 3.67 | 0.261 |
| At Contact | 4.93 | 0.351 |
| Maximum | 7.45 | 0.531 |
| Maximum Stress = 61,000 PSI | | |

An example of a typical discriminating sensor, with the characteristics shown in FIG. 14 and designed according to the teachings of this invention for installation in the passenger compartment has the following parameter values:

Sensor Designation: P053.80

Mass dimensions=0.35 (wide)×0.22 (high)×0.1 (thick) inches
Travel=0.12 inches
Beam length=0.85 inches
Beam width=0.305 inches
Beam thickness=0.004 inches
Over travel=0.2 inches
Sensing mass=1 grams
Beam Material=BeCu

| Bias: | Force gms | Deflection |
| --- | --- | --- |
| Initial | 4.0 | 0.06 |
| At Contact | 12.0 | 0.18 |
| Maximum | 25.3 | 0.38 |
| Maximum Stress = 58,000 PSI (with over travel of .2 inches) | | |

The above two embodiments of FIG. 1 and FIG. 4 illustrate the principle of this invention. Although the flat cantilevered contact beam geometries are demonstrated here, the invention is not restricted by this shape. Also, although various shaped sensing masses are disclosed, there are other mass shapes which would function as well. As long as the sensing mass is supported in such a manner that it is relatively insensitive to cross axis vibrations and is not damped by fluid or magnetically, many other geometries can be used to fully accomplish the purposes of this invention.

Figure 9:
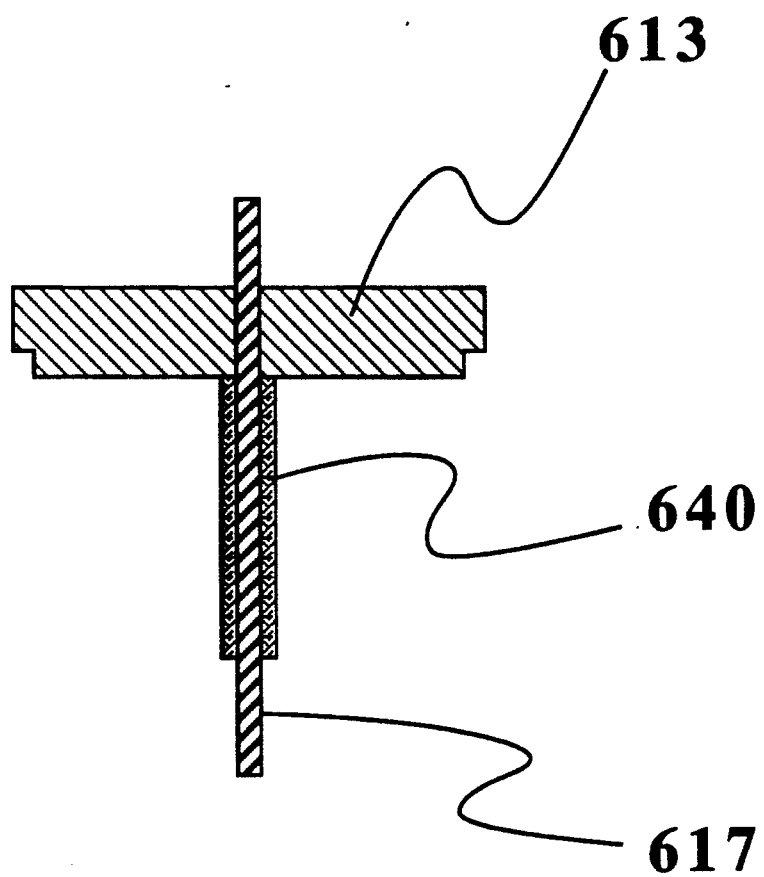
FIG. 9 is a cutaway view of a contact beam and top of housing with the application of an antivibration damping material.

In some sensors designed according to the teachings of this invention, and in particular the more sensitive arming sensors or sensors which are mounted on particularly rigid locations, vibrations can be introduced into the contacts. Although no deleterious effects have been observed from these vibrations, they can be effectively damped out through the application of a coating of a thin damping material such as silicone rubber 640 onto the surface of the contacts 617 as shown in FIG. 9. It is envisioned that for most applications the contacts will be plated with gold at least at the contact points.

In the preferred embodiments mentioned above, the mass is connected directly to the housing through pivots. Naturally this construction can be varied in several alternate ways. In one example, a cylindrical slot is provided in top 13 and a mating rod is formed on mass 11 as shown in FIG. 11. Naturally, there are many other methods of rotatably attaching mass 11 to the sensor housing including, but not limited to, insert molded hinges and knife edge supports such as disclosed in the referenced patents.

Figure 8:
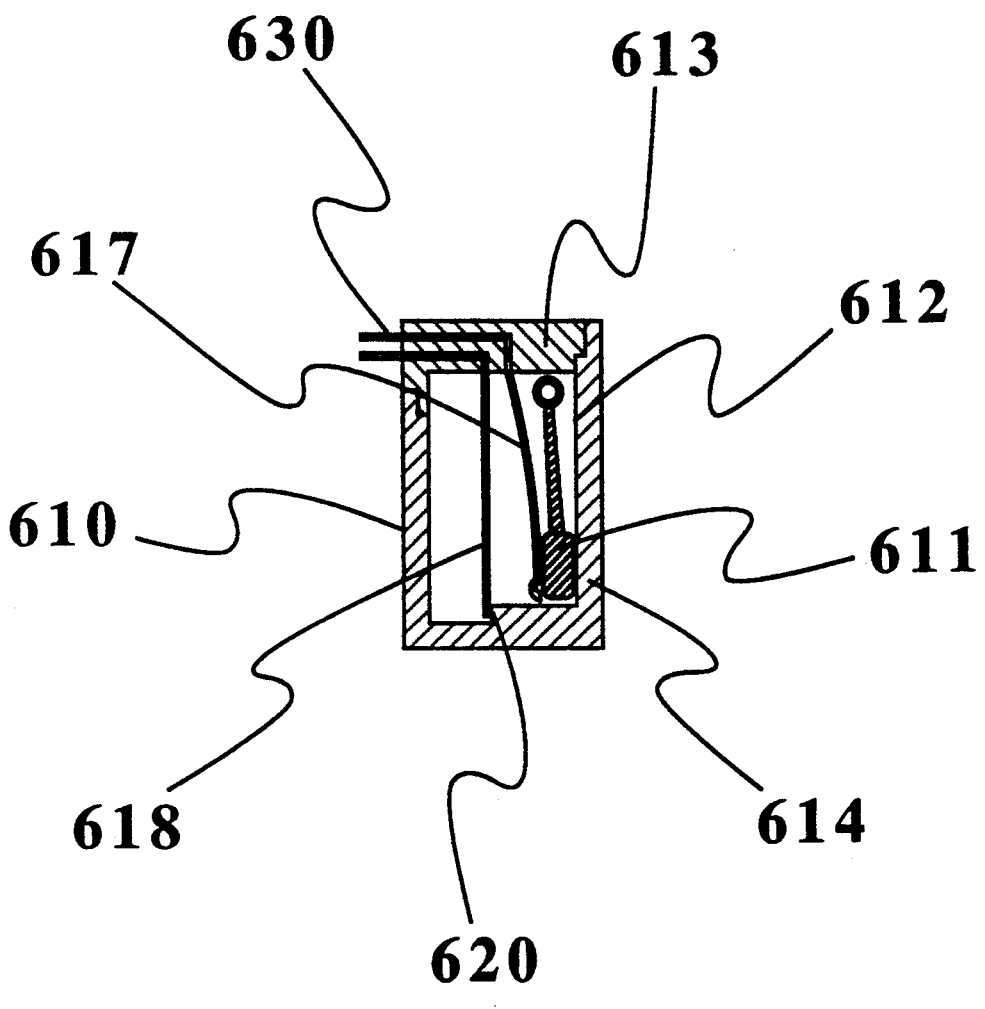
FIG. 8 is an alternate method of connecting the contacts to the restraint system using an integral connector.

If the same material is used for both the contact and the connection to the printed circuit board or wire leading to the other instrumentality of the system, the construction shown in FIG. 1 would suffice. In some cases, however, it may be desirable to bring the wires through the housing and make the connection to the contacts as shown in FIG. 8. In this case pins 630 form the terminals of an integral connector which is molded into the housing to 613. The other numbered references starting with sensor 610 have the same function as the corresponding parts in FIG. 1 starting with 10.

In U.S. Pat. No. 3,522,575 of Watson et al, an adhesive coating is applied to conductive materials and thus hermetical sealing is obtained between the conductor and the plastic for electrical connectors. The coating material mentioned in that patent is a phenolic resin with 6 percent content of polyvinyl chloride. Sealing is important to the operation of crash sensors since the interior of a crash sensor must be protected from dust and moisture to avoid malfunctioning. The current technique used to seal ball-in-tube sensors includes surrounding the sensor by a sand-epoxy mixture. This technique is not reliable, is expensive and adds a great deal of weight to the sensor.

If the technique of the metal-plastic coating is applied to crash sensors, as suggested in this invention, the bonding between the conductor and the plastic of a sensor can be insured within the operating temperature range for crash sensors, which is usually specified as from −40° F. to more than 225° F. Such bonding can be provided by a resilient coating material, such as the one disclosed in the patent of Watson et al.

Figure 15:
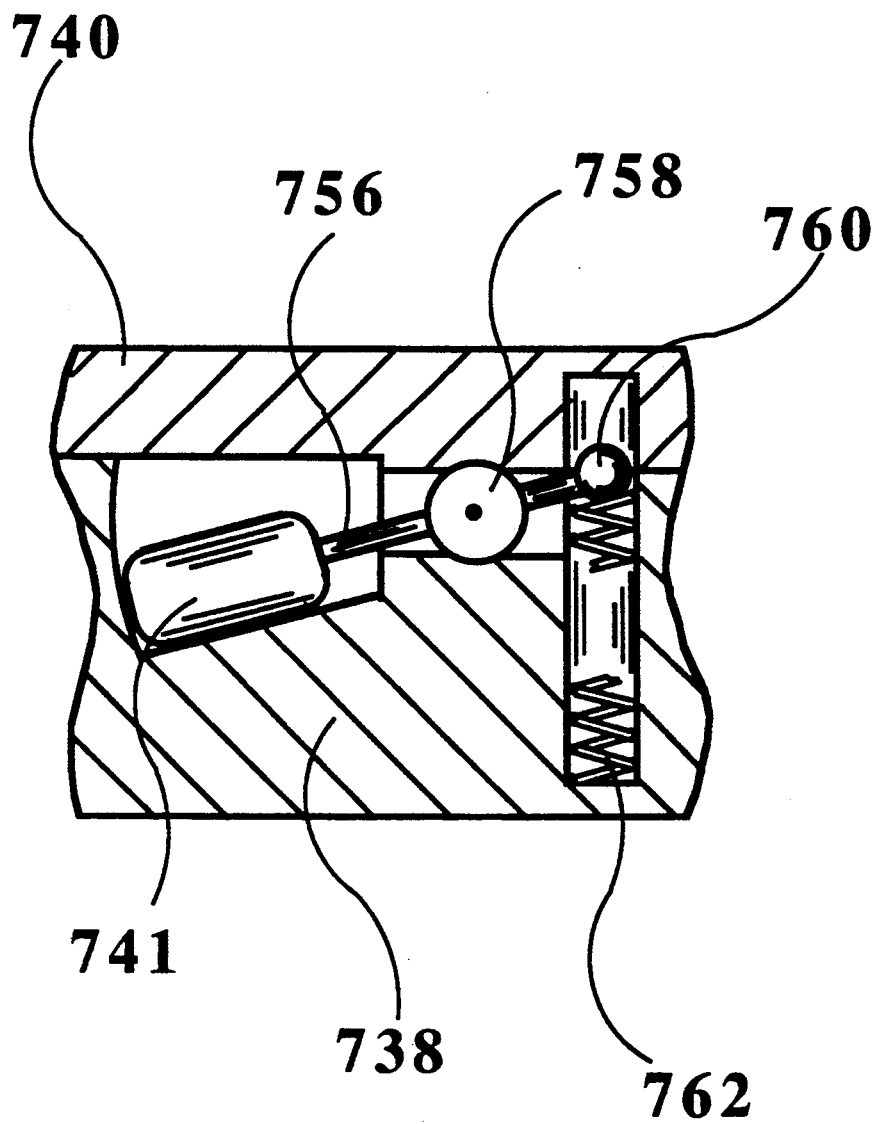
FIG. 15 is an enlarged fragmentary view of the sensing mass and attached pin extending from the D-shaft prior to rotation of the sensing mass incident to a crash as adapted to the all mechanical system of U.S. Pat. No. 4,580,810.
Figure 16:
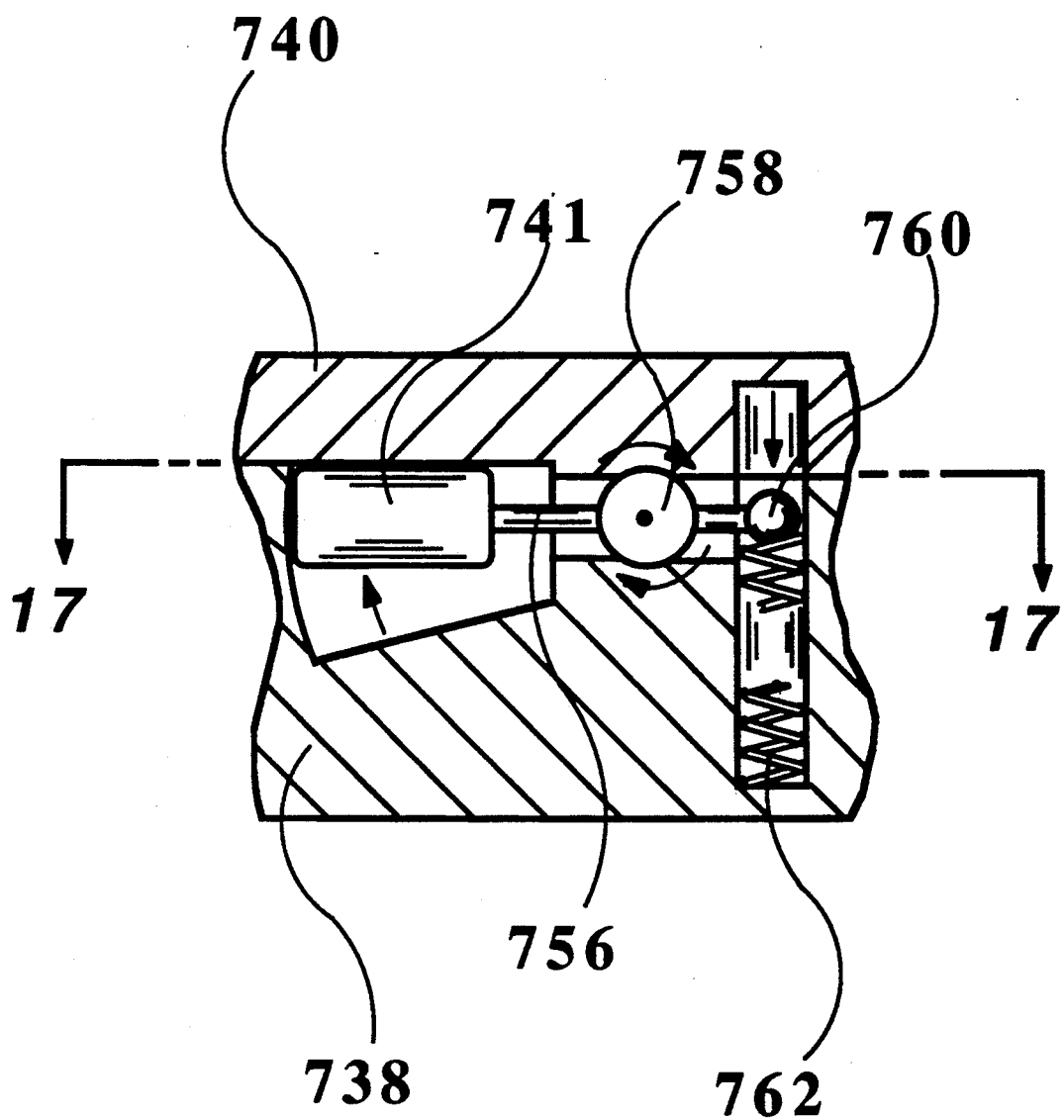
FIG. 16 is a similar view as FIG. 15 showing the sensing mass rotated as a result of a crash.
Figure 17:
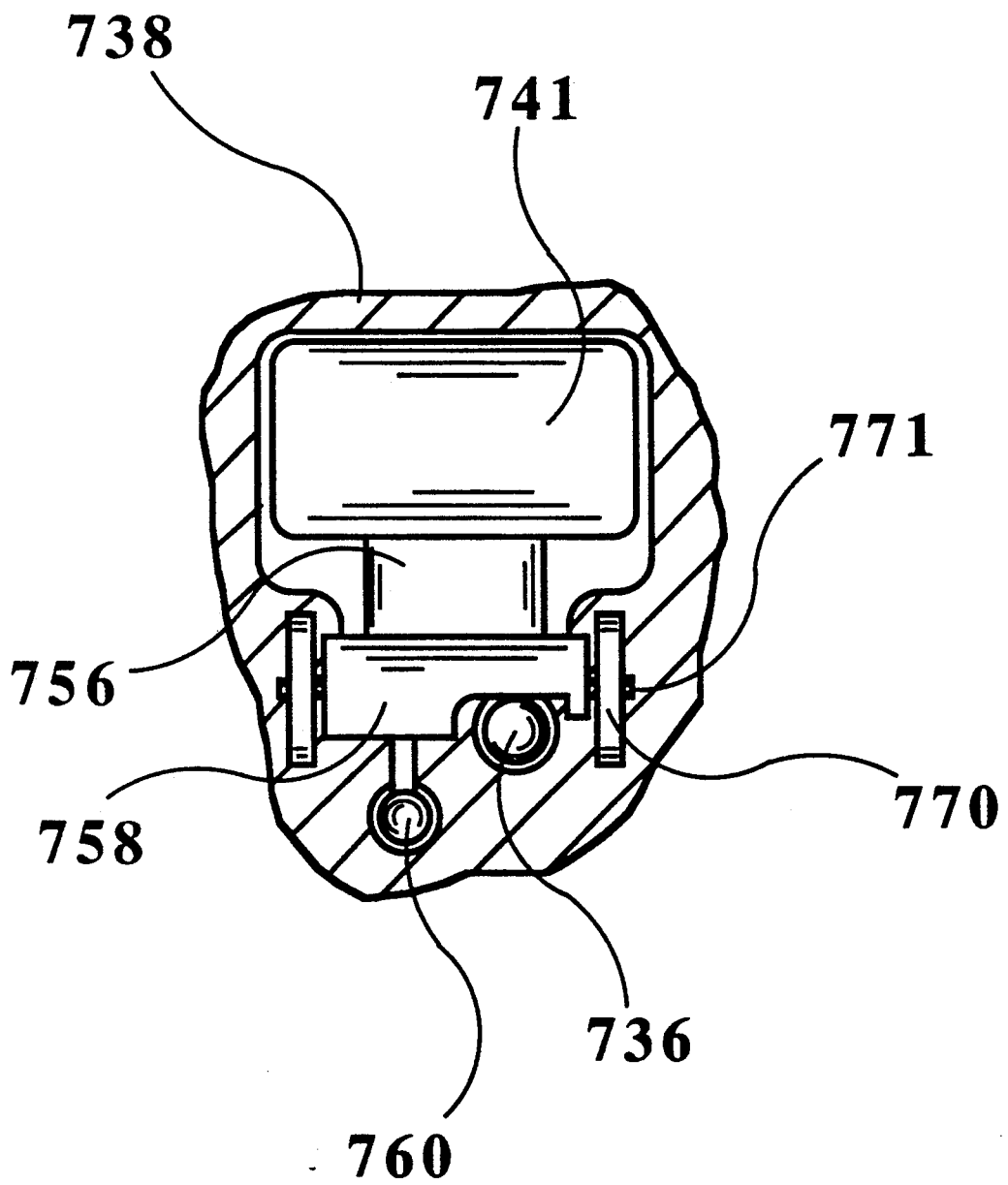
FIG. 17 is a view of the apparatus shown in FIG. 16 taken along lines 17—17.

FIG. 15 shows a fragmentary view of the sensing mass and attached pin extending from the D-shaft prior to rotation of the sensing mass incident to a crash as adapted to the all mechanical system of U.S. Pat. No. 4,580,810. This figure corresponds to FIG. 6 of that referenced patent and shows the improved sensing mass design. FIG. 16 shows the same view as in FIG. 15 with the sensing mass rotated into the actuating position where it has released the firing pin to initiate deployment of the air bag. FIG. 16 corresponds to FIG. 7 in U.S. Pat. No. 4,580,810. FIG. 17 is a view taken along line 17—17 of FIG. 16 and shows the shape of the sensing mass 741. Like number references point to identical parts in the FIGS. 15–17. Sensing mass 741 is retained in housing 738 and is adapted to rotate with D-shaft 758. This rotation is facilitated by pivots 771, which form a part of the D-shaft, and pivot plates 770. In this manner the sensing mass in hinged to the sensor housing permitting only rotational motion and rendering the sensor insensitive to the effects of cross axis accelerations. In this embodiment, mass 741, pin 756, ball 760 and D-shaft 758 and all made as one part which reduces the cost of the assembly. Naturally they could be made as separate parts and assembled. When D-shaft 758 rotates through a sufficient angle, it releases firing pin 736 in the same manner as shown in FIGS. 8 and 9 in U.S. Pat. No. 4,580,810. The motion of the mass in undamped since the clearance between the mass 741 and housing 738 is sufficiently large so as to minimize the flow resistance of the air as the mass rotates.

Naturally, two sensor systems of the type disclosed in FIGS. 15–17 can be used in the AMS in a similar way as shown in U.S. Pat. No. 4,580,810.

Figure 18:
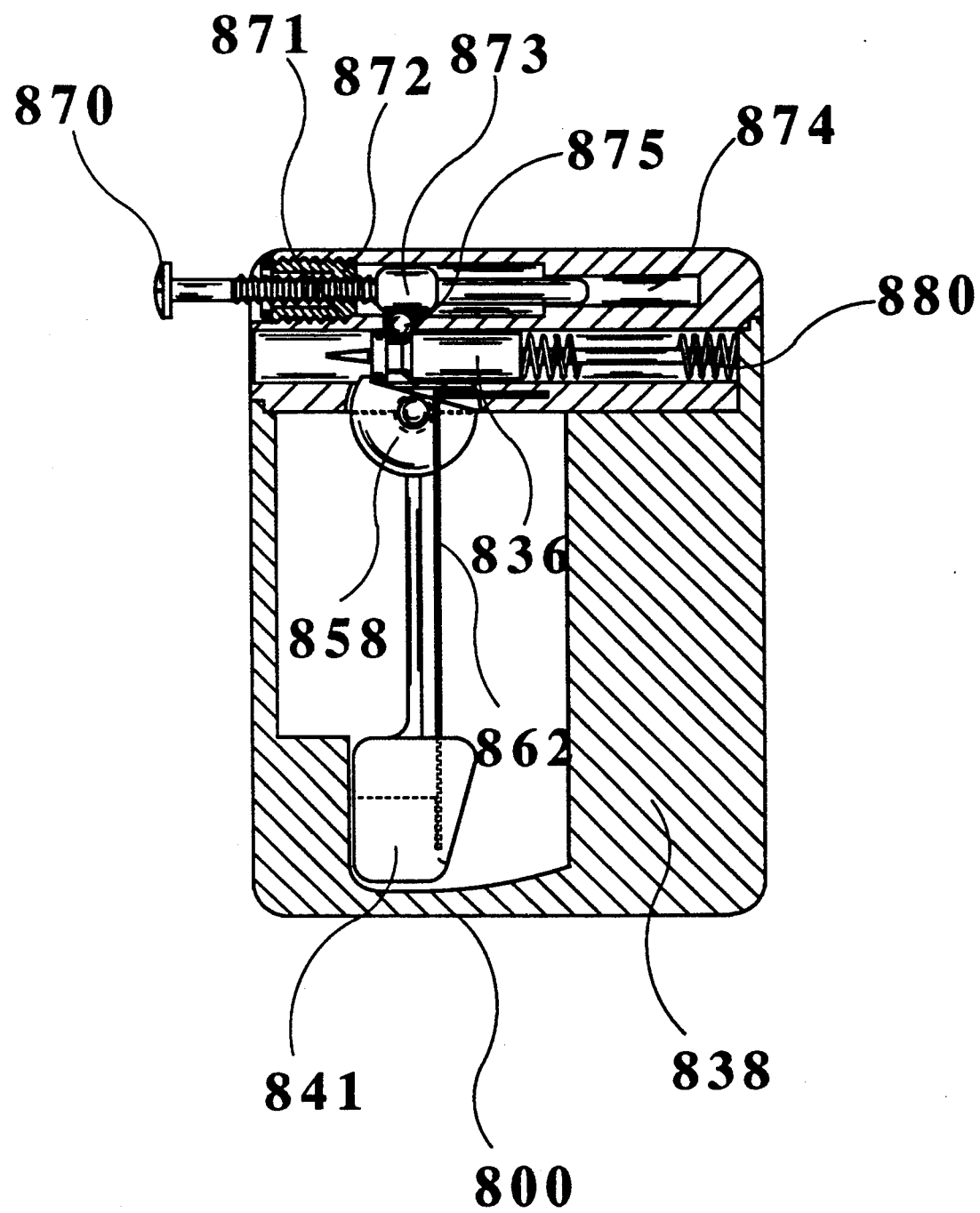
FIG. 18 is a cross section view of a sensor for use in an all mechanical system where the sensor is mounted outside of the inflator housing shown in an unarmed or safe position prior to assembly with an inflator.
Figure 19:
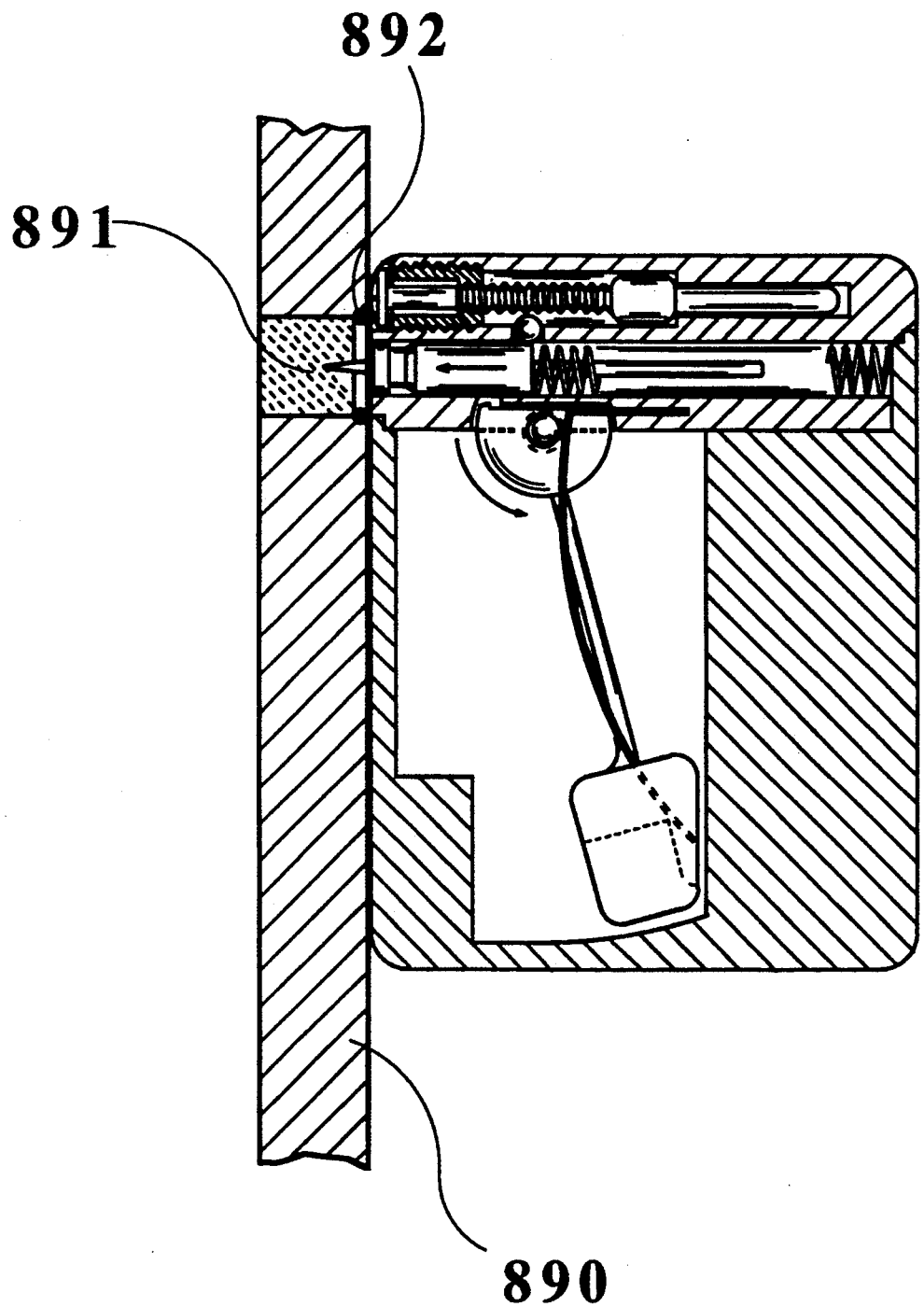
FIG. 19 is a cross section view of the sensor shown mounted on an inflator, shown in a fragmentary view, after it has triggered in response to a vehicle crash.

The AMS system as depicted in FIGS. 15–17 requires that a special inflator be designed to accommodate the sensor within its housing. There has already been a substantial investment in tooling and production lines by several inflator manufacturers in electrically actuated inflators. Also, substantially reliability statistics have been accumulated on these inflator designs through the hundreds of millions of miles that air bag equipped vehicles that have traveled. It is desirable to build on this base with new systems which can be done using the sensor designs of this invention as depicted in FIGS. 18 and 19. This sensor design is adapted to be attached to a standard electrical inflator design where a stab primer is used in place of the electrically actuated squib normally used.

In a similar manner as above, mass 841 rotates during a crash against the force provided by biasing spring 862 until the D-shaft 858 has rotated sufficiently to release firing pin 836. Once released, firing pin 836 impacts primer 891 to initiate deployment of the air bag. A washer containing an orifice 892 is provided in the top of primer 891 to minimize the leakage of inflator gases from the inflator 890 while the propellant is burning. In this manner, the sensor does not have to be constructed of strong materials as discussed in the above referenced patent.

In one configuration, the sensor 800 is mounted using an appropriate apparatus (not shown) to the steering wheel after the wheel is mounted to the vehicle and before the air bag module has been assembled to the steering wheel. In this case the sensor is armed after it has been installed onto the vehicle through the use of arming screw 870. The inflator is only brought into contact with the sensor after the sensor has been mounted onto the vehicle thus minimizing the chance of an inadvertent actuation prior to installation. To arm the sensor, arming screw 870 is rotated after the sensor is mounted onto the steering wheel causing it to move downward in its housing 874. This removes the retaining cylinder 873 from blocking the motion of locking ball 875 which removes a lock on the firing pin. As long as ball 875 remains locking the firing pin 836, rotation of the mass 841 will not release the firing pin and the sensor is in the unarmed position. Additional apparatus, not shown, can be used to prevent the assembly and dissemble of the sensor form the steering wheel unless the arming screw 870 is in the unarmed position. Also, interference between the head of arming screw 870 and the surface of inflator 890 prevents assembly of the inflator and air bag module to the steering wheel unitl the sensor has been armed. Thus, in this very simple manner, an inexpensive AMS system can be made using standard inflator designs with minor modifications.

Although several preferred embodiments are illustrated and described above, there are possible combinations using other geometries, materials and different dimensions of the components that can perform the same function. For example, the bias and contact need not be connected permitting the use of many types of switches such as a reed switch. In this latter case the mass would comprise a magnet. Therefore, this invention is not limited to the above embodiments and should be determined by the following claims.

What is claimed is:

1. A spring mass crash sensor for mounting in the passenger compartment comprising:
    (1) a housing;
    (2) a mass in said housing having one end rotatably attached to said housing thereby forming a rotatable attachment;
    (3) means to support said mass in said housing, said support means providing a substantially greater resistance to vertical and lateral forces than to longitudinal forces on said mass;
    (4) a first contact means;
    (5) a biasing means for biasing said mass toward a first position in said housing;
    (6) a second contact means acting in cooperation with said first contact means for closing an electrical circuit when said mass moves to a second position in said housing.

2. The invention according to claim 1 wherein said first contact means is cantilevered from said housing.

3. The invention according to claim 1 wherein said second contact means is cantilevered from said housing.

4. The invention in accordance with claim 1, wherein said first contact means is formed from a metal strip and has a width which is much larger in dimension then its thickness.

5. The invention in accordance with claim 1, wherein said contact means and said housing are attached by insert molding.

6. The invention in accordance with claim 1, wherein said contact means are made of metal and molded into said housing.

7. The invention in accordance with claim 1, wherein said first contact means provides said biasing force.

8. The invention in accordance with claim 1, wherein said biasing means comprises a spring.

9. The invention in accordance with claim 1, wherein said first and second contact means are combined with said housing in a molding process.

10. The invention in accordance with claim 9, wherein said contact means are treated to become adhesive to plastic so as to prevent separation between said contact means and said housing within the operating temperature range of said sensor.

11. The invention in accordance with claim 10, wherein said treatment provides hermetical sealing to said sensor.

12. The invention in accordance with claim 1, wherein means are provided to hermetically seal the sensor.

13. The invention in accordance with claim 1, wherein said contact means are coated with a dampening material to reduce vibrations.

14. The invention in accordance with claim 1 wherein the biasing force at the first position is less than half of the biasing force at the second position.

15. The invention in accordance with claim 1, wherein said rotatable attachment comprises a hinge.

16. A system for triggering a passive occupant restraint device for a motor vehicle having a crush zone in the forward region thereof, said system comprising in combination:
    (a) at least two discriminating sensors disposed in said vehicle crush zone;
    (b) a discriminating sensor disposed in said vehicle remote from said crush zone;
    (c) an arming sensor disposed in said vehicle remote from said crush zone; and
    (d) means, responsive to said sensors, for triggering a passive occupant restraint system in said vehicle when one of said discriminating sensors and said arming sensor indicate an incipient vehicle crash;
    wherein at least one sensor comprises:
    (1) a housing;
    (2) a mass in said housing;
    (3) means to support said mass in said housing, said support means providing a substantially greater resistance to vertical and lateral forces than to longitudinal forces on said mass;
    (4) a first contact means;
    (5) a biasing means for biasing said mass toward a first position in said housing,
    (6) a second contact means acting in cooperation with said first contact means for closing an electrical circuit when said mass moves to a second position in said housing.

17. The invention in accordance with claim 16, wherein at least one of said crush zone mounted sensor is a crush switch.

18. The invention in accordance with claim 16 wherein said sensor system comprises two crush zone mounted crush switch sensors, a non-crush zone mounted arming sensor and a noncrush zone mounted discriminating sensor.

* * * * *